United States Patent
Van Dijk et al.

(10) Patent No.: US 10,177,417 B2
(45) Date of Patent: Jan. 8, 2019

(54) IRON-SULPHIDE-BASED BATTERY AND ANODE

(71) Applicant: E-STONE BATTERIES B.V., Amsterdam (NL)

(72) Inventors: Thomas Van Dijk, Amsterdam (NL); Fokko Marten Mulder, Leiden (NL)

(73) Assignee: E-STONE BATTERIES B.V. (NL)

( * ) Notice: Subject to any disclaimer, the term of this patent is extended or adjusted under 35 U.S.C. 154(b) by 491 days.

(21) Appl. No.: 14/774,941

(22) PCT Filed: Mar. 14, 2014

(86) PCT No.: PCT/NL2014/050155
§ 371 (c)(1),
(2) Date: Sep. 11, 2015

(87) PCT Pub. No.: WO2014/142666
PCT Pub. Date: Sep. 18, 2014

(65) Prior Publication Data
US 2016/0020493 A1     Jan. 21, 2016

(30) Foreign Application Priority Data
Mar. 15, 2013 (NL) .................................... 2010462

(51) Int. Cl.
*H01M 4/58*     (2010.01)
*H01M 10/24*     (2006.01)
(Continued)

(52) U.S. Cl.
CPC ............ *H01M 10/24* (2013.01); *C01G 49/12* (2013.01); *H01M 4/0433* (2013.01);
(Continued)

(58) Field of Classification Search
CPC ........... H01M 10/24; H01M 2004/021; H01M 2300/0014; H01M 4/0433; H01M 4/248; H01M 4/5815; H01M 4/622; H01M 4/625
See application file for complete search history.

(56) References Cited

U.S. PATENT DOCUMENTS 4,250,236 A * 2/1981 Haschka ................ H01M 4/248
429/207

FOREIGN PATENT DOCUMENTS

GB     1359746     7/1974

OTHER PUBLICATIONS

International Search Report and Written Opinion; dated Jun. 24, 2014 for PCT Application No. PCT/NL2014/050155.
(Continued)

*Primary Examiner* — Basia A Ridley
*Assistant Examiner* — Heng M. Chan
(74) *Attorney, Agent, or Firm* — Mendelsohn Dunleavy, P.C.

(57) ABSTRACT

A battery including an anode including iron sulphide as active material, with the sulphur content being at least 5 wt. % of the total of iron and sulphur, a cathode, and an alkaline electrolyte including an alkaline component dissolved in water, with the anode including less than 50 wt. % of other active materials than iron sulphide. Preferably, the sulphur content of the anode is more than 10 wt. % of sulphur, calculated in the total of iron and sulphur and 70 wt. % or less.

The use of iron sulphide in the anode provides a rechargeable electrical energy storage system which is low-cost, easy to produce, and environmental friendly, and which shows a long lifetime and has excellent electrochemical properties like high power density and good cycling efficiency. The
(Continued)

battery according to the invention also shows superior charge/discharge behavior as compared to e.g. lead-acid and nickel-iron batteries.

19 Claims, 6 Drawing Sheets

(51) Int. Cl.
    *H01M 4/04*     (2006.01)
    *H01M 4/24*     (2006.01)
    *C01G 49/12*     (2006.01)
    *H01M 4/62*     (2006.01)
    *H01M 4/02*     (2006.01)

(52) U.S. Cl.
    CPC ......... *H01M 4/248* (2013.01); *H01M 4/5815* (2013.01); *H01M 4/622* (2013.01); *H01M 4/625* (2013.01); *C01P 2006/40* (2013.01); *H01M 2004/021* (2013.01); *H01M 2300/0014* (2013.01)

(56) References Cited

OTHER PUBLICATIONS

Kim, B., et al. "All solid state Li-ion secondary battery with FeS anode." Solid State Ionics 176.31 (2005): 2383-2387.

\* cited by examiner

IRON-SULPHIDE-BASED BATTERY AND ANODE

BACKGROUND OF THE INVENTION

The present invention pertains to a battery, a novel iron-sulphide-based anode suitable for use in said battery, methods for producing said anode and battery, and use of said battery.

Around 1970 nickel-iron batteries competed with lead-acid for a larger market share. They were favorable because of their longer lifetime and their safe alkaline electrolyte. The anode material was metallic iron, mostly sintered or pressed where iron and iron oxides were mixed. However, the nature of the metallic iron and nickel hydroxide electrode causes low energy efficiency, high self-discharge, bad high discharge characteristics and gassing problems. The sintering and/or annealing process led to high manufacturing cost. As a result, nickel-iron batteries got displaced by other types (especially lead-acid) in almost all applications.

At present, the lead-acid battery is one of the market leaders in the battery field, with the main advantages being low cost and low maintenance. However, the short lifetime, failure on deep and high rate discharges and it holding hazardous materials make it unfavorable for stationary applications, e.g. on-grid peak shaving or off-grid energy systems with a lifetime of up to 20 years.

Another development in the battery field was a focus on light batteries for laptops and electric vehicles. Lithium-ion batteries gained interest due to their low weight and high energy density. However, Li-ion batteries suffer from lifetime issues and high production cost, and are therefore not very suitable for stationary applications.

In stationary applications, weight is not a primary issue. The ideal stationary battery has a lifetime of 20 years at daily charge/discharge cycles, has a good energy cycling efficiency, is capable of supplying peak loads and deep discharges, is robust and uses environmental benign and available materials. The need for this battery is eminent, both for off-grid systems and on-grid peak shaving applications. The present invention provides such a battery with a novel realisation of the anode based on iron sulphide.

The battery according to the invention comprises an anode comprising iron sulphide as active material, with the sulphur content being at least 5 wt. % of the total of iron and sulphur, a cathode, and an alkaline electrolyte comprising an alkaline component dissolved in water, with the anode comprising less than 50 wt. % of other active materials than iron sulphide.

It has been found that the use of iron sulphide in the anode provides a rechargeable electrical energy storage system which is low-cost, easy to produce, and environmental friendly, and which shows a long lifetime and has excellent electrochemical properties like high power density and good cycling efficiency. The battery according to the invention also shows superior charge/discharge behavior as compared to e.g. lead-acid and nickel-iron batteries.

It is noted that sulphur (e.g. in the form of ferrous sulphide) has been used as an additive in the iron electrode of conventional nickel-iron batteries, to accomplish the initial activation and add defects in the electrode that increase bulk conductivity. However, the amount of sulphur added was reported to be required to be below 1 wt. %, because higher sulphur contents were considered undesirable. For example, GB 1359746 indicates that a sulphur content in excess of about 0.03 wt. % S had very undesired effects on the battery.

It is also noted that iron sulphide is sometimes used in the cathode of anhydrous lithium ion batteries, where it is used to intercalate lithium and ultimately form $Li_2S$ and Fe upon discharge. This is of course different from the present invention, where the iron sulphide is used in the anode in an aqueous alkaline battery and not as cathode of an anhydrous lithium battery.

Further, Bong-Chull Kim et al. (Solid State Ionics 176 (2005) 2383-2387) describes an all solid state Li-secondary battery with FeS anode. These solid-state Li-ion batteries also use the intercalating effect of Lithium in FeS and therefore are fundamentally different from batteries based on aqueous alkaline electrolyte like that of the present invention.

BRIEF SUMMARY OF THE INVENTION

The advantageous properties of the battery according to the invention can, e.g., be seen from the following. In the field of battery applications, current (charge) is most commonly measured in Charge-rates, also indicated as C-rates in the present specification. A 1C-rate is when the battery is fully charged or discharged in 1 hour. In the following the term C-rate will be used to indicate the discharge rate. As an example: if a battery has a capacity of 10 Ah and a voltage of 1.2 V, the 1C-rate corresponds to a discharge of 10 A during 1 hour.

The iron sulphide anode of the invention can withstand C-rates as high as 150 C while maintaining a cycling efficiency of more than 60%. At lower C-rates the cycling efficiency is much higher, in the order of 80-90%. The high current charge and discharge capability of up to 1200 Watt/kg is exceptional for alkaline-base and lead-acid batteries.

The cycling efficiency at C1-rates can reach 90% energy efficiency. The Coulombic efficiency is nearly 100% at all C-rates, even when 150 C-rates are applied.

The open circuit voltage (OCP) of the cell, combined with a Nickel Hydroxide cathode in alkaline environment, is around 1.4 volt, and is thus suitable for operation with aqueous electrolytes. This resembles the OCP of alkaline batteries. For example, zinc-manganese-oxide, NiMH, and NiFe, have similar open circuit potentials. Lead acid has an OCP of 2 V and Li-ion of 3 V. Li-ion is never used with water since at this voltage water will split into hydrogen and oxygen gas immediately.

The present invention will be discussed in more detail below. The battery according to the invention comprising an anode comprising iron sulphide as active material, with the sulphur content being at least 5 wt. % of the total of iron and sulphur. In one embodiment, the iron sulphide has more than 10 wt. % of sulphur, calculated in the total of iron and sulphur. In general, the sulphur content can be as high as 70 wt. %. In one embodiment, the sulphur content is in the range of 20-40 wt. %, which corresponds to the sulphur content of many naturally occurring iron sulphides.

DETAILED DESCRIPTION OF THE INVENTION

More in particular the sulphur content in one embodiment corresponds to FeS with 36 wt. % or 50 atomic % sulphur.

It is noted that there is no limitation on the structure of the iron sulphide used as starting material or occurring during cycling in the present invention. Iron sulphide is a very versatile material, and different ferrous and ferric sulphide compounds can co-exist. The iron sulphide can change its stoichiometry upon cycling. Further, formation of related compounds upon cycling can also not be excluded, and is included in the term iron sulphide as active material within the context of the present specification.

The iron sulphide used in the process, battery, and anode according to the invention can be derived from natural or synthetic sources. Suitable natural sources include iron sulphide minerals, e.g., minerals selected from the group of troilite, pyrite, mackinawhite, greigite, pyrrhotite and marcasite. Synthetic iron sulphide may also be used. However, using available iron sulphide mineral may be attractive from an economic point of view.

The electrode of the present invention may comprise further components.

In one embodiment, the electrode comprises a binder to bond iron sulphide particles together. Suitable binders are known in the art. They are generally polymeric in nature. Examples include PTFE, PVDF, Polyaniline, Pyrrole, Polyethylene, and PMMA. Other examples include acrylic binders, acetyl triethyl citrate, diethyl phthalate, polyalkylene glycol.

The binder, if present, is generally used in an amount of 5-50 wt. %, calculated on the amount of iron sulphide, preferably in an amount of 10-20 wt. %. If the amount of binder is too low, its binding effect may be insufficient, depending on the properties of the iron sulphide. If the amount of binder is too high, its binding effect will not be improved, while the weight, cost, conductivity, and/or accessibility of the electrode may be detrimentally affected.

If so desired, conductive particles may be included in the electrode according to the invention to improve the energy efficiency. Since the conductivity of iron sulphide by itself is sufficient, the addition of further conductive particles is generally not necessary. It may be attractive, however, in the case that a binder is used, since the presence of a binder may affect the conductivity of the electrode. Suitable conductive particles are known in the art and include carbon black, graphite, silver, gold, graphene, carbon nanotubes and others.

In one embodiment, the electrode according to the invention is porous, that is, it has a relatively high surface area, which allows intimate contact between the electrolyte and the electrode. The surface area of the electrode can, e.g., be at least 20 $m^2/g$, more in particular at least 50 $m^2/g$. In one embodiment, the electrode is based on FeS nanoparticles which have a surface area in the range of 100-1000 $m^2/g$.

It has been found that when the iron sulphide is in contact with the alkaline electrolyte in the battery according to the invention, pores are formed due to dissolution of sulphur and iron sulphide. However, the electrode stays intact and firm, even after many cycles. If a more porous structure is desired, e.g., to improve the energy efficiency of the battery, additional pores can be created with appropriate techniques like mixing the iron sulphide during manufacture with a powder, e.g. sodium carbonate, which is removed from the electrode after pressing, e.g., by being washed out. Care should be taken to select a powder which can be washed out without reacting with the iron sulphide to form insoluble compounds.

The electrode according to the invention can be based on only iron sulphide as active material. It is possible for the electrode to contain additional active materials. Suitable active materials which may additionally be present include zinc, metallic iron, and iron hydroxide. Within the context of the present specification the term active material is the material which contributes electrons and ions to the redox reaction. Elements like lithium, sodium, and magnesium may be present as additives for increasing the activity of the anode. They are also included in the term active material within the context of the present invention.

As the present invention relies on the advantageous effect of the iron sulphide, the anode contains less than 50 wt. % of other active materials, in particular less than 20 wt. %, more in particular less than 10 wt. %, calculated on the total amount of active material present in the anode.

Practical electrodes of the anode material in this invention can be made with or without additives and with or without substrate. If so desired, the electrode may be provided on a substrate. Suitable substrates are known in the art and include, for example a metal, e.g., iron or nickel, mesh, and metal, e.g., nickel or iron foam. More advanced substrates include carbon nanotubes and graphene. Recently a $FeO_x$/graphene hybrid electrode has proven its excellent electrochemical behavior. FeS might be a good replacement of $FeO_x$. FeS can be "loaded" into or onto carbon nanotubes, that are grown on graphene sheets or other substrates. Graphene oxide sheets can also be used to directly "grow" iron sulphide particles on.

The iron sulphide-based electrode can, e.g., be manufactured by a process comprising the steps of providing particulate iron sulphide, and shaping the particulate iron sulphide to form an electrode.

The particulate iron sulphide may, e.g., be obtained by grinding iron sulphide to the desired particle size. The Particle size preferably is in the sub-micron range, with the mean particle diameter preferably being in the range of 1-1000 nm, in particular in the range of 50-600 nm, more in particular in the range of 80-400 nm. Particle size may be determined with X-ray and the Scherrer constant, or by microscopy.

Milling can be carried out in conventional apparatus, e.g., in a ball mill or other suitable grinder.

The particulate iron sulphide can be shaped directly into a shaped object to form an electrode. It is possible, however, to add further components to the iron sulphide before the shaping or forming step. For a description of further components and the amount in which they may be used reference is made to what is stated above.

The shaping of the particulate iron sulphide to form an electrode can be carried out by methods known in the art. In one embodiment, a compacting step is applied, e.g., using a press. Other common techniques are pasting and casting. Casting is when a wet or dry slurry of iron sulphide optionally combined with additives or adhesives is cast into a film. The film might be self-supporting or compacted onto a current collector substrate. Pasting is when a mixture of iron sulphide, water, and optionally further compounds such as binders, solvent, expanders and/or other additives is kneaded to obtain a paste, which is pasted onto a substrate or into a mold. Pressing is applied and the electrode is dried at elevated temperatures. Pasting is a common process in lead and nickel hydroxide electrodes.

The anode as described above is used in a battery which further comprises a cathode and an alkaline electrolyte. The configuration of an iron sulphide battery is not restricted. Depending on the configuration a separator may be present to separate the two electrodes.

It is noted that the present invention pertains to the battery described herein, and to the anode suitable for use in the battery described herein. Any specification for the anode presented herein applies to both the anode as such and to the anode when incorporated into the battery. This also applies to the manufacture of the anode.

The nature of the cathode is not critical to the present invention. Any positive electrode with a suitable potential can be used. A suitable potential is a potential that is higher than −0.40 V measured with respect to the Standard Hydrogen Electrode (SHE) potential. In aqueous solutions potentials in the range of 0.4-1.4 V versus SHE are desirable. Higher voltages will results in the splitting of water into hydrogen and oxygen. When using organic electrolytes, larger potentials can be used because no water will be split. Examples of suitable electrodes include nickel hydroxide, air-cathodes, manganese dioxide, cadmium and others. Air-cathodes are new in the art and can exist of a powder composite comprising carbon black, catalyst particles (typically manganese oxides) and a hydrophobic polymeric binder. These metal-air (or FeS-air) batteries use oxygen and water that are reduced to hydroxide at the cathode. The use of a nickel hydroxide cathode is considered preferred, because it has been improved over decades into a robust electrode with a long cycle life.

The process of making sintered Nickel hydroxide electrodes is a well-established art. In the last decades pasted electrodes have entered the consumer market due to lower price. Of these electrodes several variants exist. Plastic bonded nickel with graphite as conductive material are common, as well as the electrodes using metal-foam as a substrate loaded with (spherical) nickel hydroxide particles coated with cobalt as conductivity enhancing additive.

The electrolyte used in the battery of the present invention is an alkaline electrolyte, comprising an alkaline component dissolved in water. The alkaline component generally is a hydroxide of an alkali metal like lithium, potassium, sodium or cesium hydroxide, or combinations thereof. Solutions comprising potassium- and/or sodium hydroxide are favored because of their low cost and good performance. Electrolyte additives as lithium hydroxide can be used, as was the case in the conventional Nickel-Iron technology. In one embodiment, an electrolyte is used which is an aqueous solution of an alkali metal hydroxide with a concentration of 0.5-10 M, in particular 4-9M. In one embodiment, in particular within the stipulated concentration range, the alkali metal is made up for at least 50 mol % of K or Na, in particular for at least 60 mol %. In one embodiment, the alkali metal is made up of a mixture of K and/or Na with Li. In this embodiment, Li is generally present in an amount of less than 50mole % calculated on the total of K, Na, and Li, in particular less than 40 mole %. If Li is present, it is generally present in an amount of at least 5 mole %.

The selection of the amount of electrolyte is within the scope of the skilled person. The minimum is governed by the amount required to obtain a functioning battery. On the other hand, the use of too much electrolyte should be avoided to prevent too much dissolution of the iron sulphide and unnecessary extra weight of the battery.

As indicated above, a separator may be present between the cathode and the anode. The separator should be porous to allow passage of the electrolyte, but should prevent the electrodes from short-circuiting. An example of a suitable separator is a polycarbonate. Polypropylene, polyolefin or other separators can also be used.

The battery according to the invention may be manufactured by processes known in the art, which require no further elucidation.

The battery according to the invention is a rechargeable battery.

Upon discharge the iron sulphide is oxidized. The exact composition of the negative electrode on oxidation is not known, since many oxides and sulphides exist.

Not wishing to be bound by theory, it is believed that some of the reactions at the negative electrode during discharge can be represented as follows:

$$FeS + OH^- \rightarrow Fe(OH)_3 + Fe_xS_y \qquad (1)$$

where x and y can range from 0.1 to 1

$$Fe \rightarrow Fe^{2+} + e^- \qquad (2)$$

$$Fe^{2+} \rightarrow Fe^{3+} + e^- \qquad (3)$$

$$S^{2-} \rightarrow \tfrac{1}{2}(S_2)^{2-} + e^- \qquad (4)$$

$$S^{2-} \rightarrow S + 2e^- \qquad (5)$$

$$(FeS)_n + H_2O \rightarrow SH^- + Fe^{2+} + OH^- + S \qquad (6)$$

Reaction (2) is believed to only happen at overcharge. During the initial three charge cycles reaction (2) is believed to happen and form metallic iron that increases conductivity. In the subsequent cycles the reactions involving iron sulphide, ferrous and ferric iron, sulphur and polysulphides, are believed to be dominant. At the positive electrode, the reactions are dependent on the nature of the electrode. For example, in the case of a nickel hydroxide electrode, nickel oxyhydroxide is reduced to nickel hydroxide upon discharge, as may be presented as follows:

$$NiOOH + H^+ + e^- \rightarrow Ni(OH)_2 \qquad (7)$$

During recharging, the reactions at the cathode and anode are reversed. Upon charge, some of the ferrous ions in the anode may be reduced to elemental iron.

The iron sulphide reaction can incorporate alkali polysulphides and ferrous ions that react with polysulphides to produce amorphous FeS and (meta)stable Fe—S clusters or polymeric $Fe_xS_y$ units where x and y can range from 0.01 to 1. Iron of different valencies may be present in the same cluster or unit. The alkali may be derived from the electrolyte. Fe—S clusters can be formed upon charging and discharging when started with iron sulphide. The iron sulphide can create defects and causes a higher hydrogen over potential (so less gassing upon charge and discharge), a lower charge voltage and a porous structure.

In the battery of the invention the use of iron sulphide causes a very clear distinction between the metallic-iron-to-ferrous-iron plateau and the ferrous-iron-to-ferri-iron plateau, which makes it possible to use only the ferrous-iron-to-ferri-iron plateau.

When initially charged, some metallic iron may form and sulphur may be dissolved as $S^{2-}$ in solution that slightly color the solution green/yellow. Also, some iron sulphide compounds are slightly soluble in the order of mmol/L. The presence of these minor amounts of dissolved sulphides do not detrimentally affect the performance of the battery.

It has been found that the battery according to the invention shows a stable conductive structure upon cycling. Not wishing to be bound by theory it is believed that this may be caused by the precipitation of Ferrous iron and sulphide ions ($S^{2-}$) to form an amorphous iron(II) sulfide. In amorphous $Fe_{1-x}S$, where x ranges from 0 to 0.2, long-range ordering of mackinawhite occurs within seconds of formation, and it is believed that the presence of mackinawhite may explain the stable conductive structure.

As will be evident to the skilled person, the battery as presented here can be connected in series or parallel to achieve the required voltage and current.

The possible applications of the battery according to the invention are almost limitless. Examples include automotive starting batteries, batteries for forklift trucks, small mobile applications and penlites. Due to its good energy density (comparable to lead-acid), its environmental friendly character, low cost and robust performance it is particularly interesting for stationary energy systems, in particular those based on renewable energy sources such as solar energy and wind energy, uninterrupted power supplies (UPS), and load-leveling on-grid applications.

In use, overcharging of the battery should preferably be prevented. Overcharging is not damaging but leads to metallic iron formation and gassing. This leads to efficiency loss (not permanent) and water evaporation, which should be prevented in maintenance free applications. Conventional charge controllers can be used to prevent overcharging.

Within the context of the present specification the terms contains and comprises are used interchangeably. Neither should be interpreted as limiting, unless this is expressly specified.

It will be clear to the skilled person that elements of different embodiments of the idea can be combined, e.g., from the description of the battery, the anode, and the method for manufacturing the anode.

The present invention will be elucidated by the following examples, without being limited thereto or thereby.

EXAMPLE 1

The iron sulphide in this example contained 29-32 wt % (weight percentage) of sulphur and 68-71 wt % of iron. The iron sulphide was ground in a ball mill with a weight of 1:50 weight ratio of iron sulphide powder to grinding balls. The iron sulphide was ground for an hour at a rotation speed of 150 rpm. The resulting particle size was submicron (100-400 nanometer). The iron sulphide was then pressed into an electrode with a hand press to a round electrode of 0.38 $cm^2$. The negative electrode was then combined with a nickel hydroxide positive electrode with a boron free silicate separator in between. The battery was connected to a Maccor, which is a laboratory Battery and Cell computerized test system that is programmed to charge and discharge the battery cell as desired.

Figure 1:
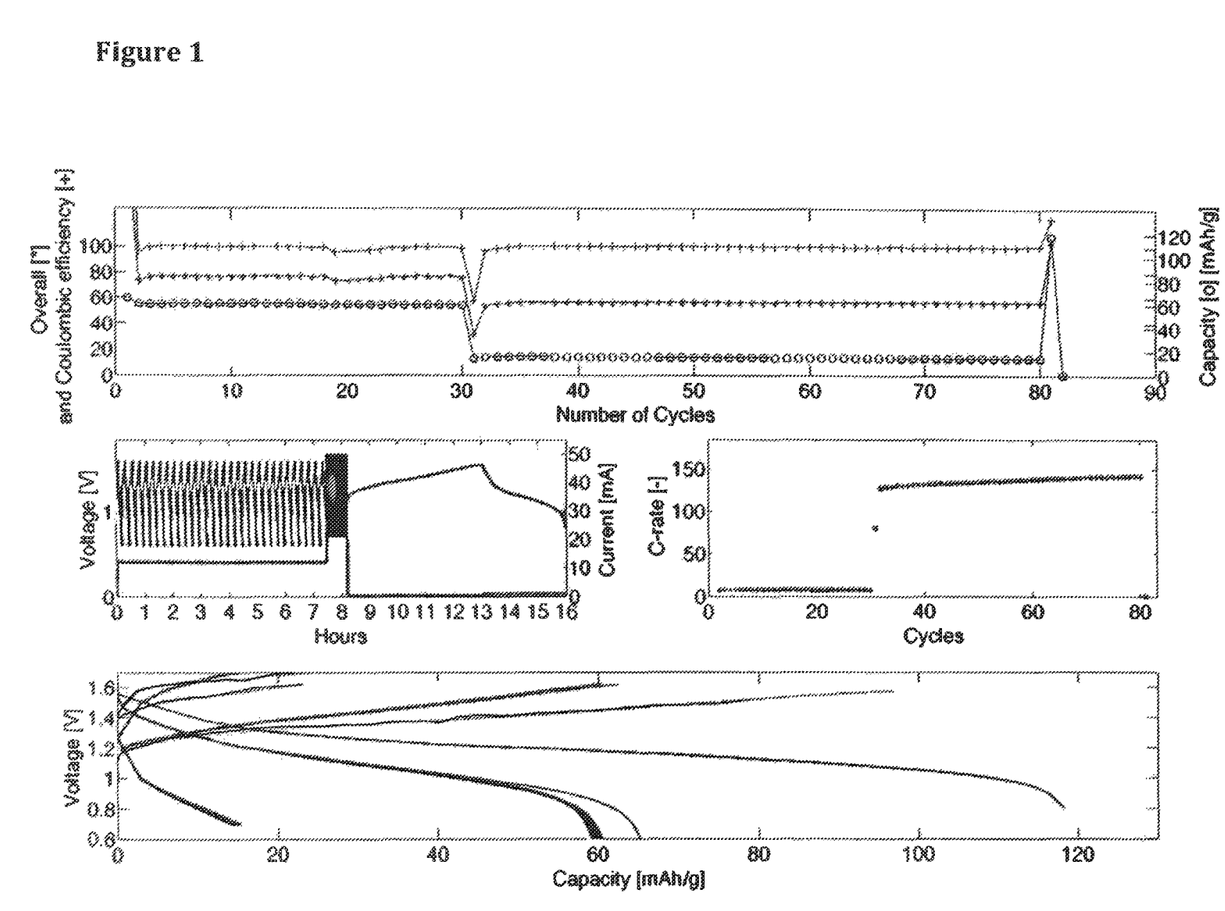
FIG. 1 shows the results of cycle tests on a battery according to the invention.

Before cycling, the battery is "activated" by slight over-charging for first 2 cycles (not shown in FIG. 1).

The electrolyte used consists of 6 M KOH aqueous solution. The current applied varied and the battery voltage cut-off varied accordingly. Due to the so called Peukert effect the resistance and thus the charge voltage becomes higher when larger currents are applied to the battery.

When a 6C rate was applied, 1.62 V was chosen to be the voltage cut-off in the first 30 cycles. In the next 50 cycles 1.7 V was the cut-off when a 150C-rate was conducted, and 1.56 V was specified in the last cycle, where a C/5-rate on charge and C/3-rate on discharge were applied.

The voltage cut-off is important since if no voltage cut-off is specified, the battery will not operate at its maximum capability. If no cut-off is specified overcharge will occur and the battery will operate at lower energy efficiency. Although the energy capacity will increase when overcharged because metallic iron is formed, efficiency is lowered and maintenance will be required since gassing is likely to occur because the metallic iron formed will spontaneously oxidize and hydrogen gas will evolve. The use of iron sulphide may influence the voltage at which the ferrous/metallic iron plateau and ferrous/ferric iron plateau are located, as well as the reaction potentials at which side reactions occur.

The results are presented in FIG. 1.

FIG. 1 shows 4 graphs, the top, the two middle graphs and the bottom graph. All graphs apply to the same charge/discharge tests, but show different parameters.

The top graph: On the x-axis the number of cycles are depicted. Every data point corresponds to one cycle, which is when the battery is charged and subsequently discharged. On the left-hand y-axis the overall (*) and Coulombic (+) efficiency are shown, the right-hand y-axis depicts the energy density in mAh/g of FeS. The coulombic efficiency is the current efficiency: i.e. at a coulombic efficiency of 100%, all ampere hours charged to the battery will be available at discharge, in other words, no electrons get lost. The overall efficiency is when voltaic efficiency is taken into account. The overall efficiency is defined as the voltaic efficiency multiplied with the coulombic efficiency.

The voltaic efficiency is 80%, which corresponds to an average charge at 1.45 Volt and an average discharge voltage of 1.15 volt. The first 30 cycles have 80% efficiency and correspond to a 6C-rate. The second 50 cycles have 60% efficiency and correspond to a 150C-rate, the last cycle shows 100% efficiency (120% coulombic) which implies that during the preceding high C-rate cycles more energy was charged than discharged.

The left graph in the middle of the figure shows the time in hours on the x-axis, the voltage profile on the left-hand y-axis and the current applied on charge and discharge on the right-hand y-axis. As the charge was applied the voltage increased on charge and decreases on discharge. To exemplify, one cycle runs from 8.1 hours to 16 hours. The charge and discharge current differs to mimic the solar charge for 5 hours during day, and the use of electricity for 3 hours during discharge.

In the first 30 cycles (0-7.4 hours), the current on charge and discharge is 12 mA (300 mA/g FeS). During the second 50 cycles, the current is 50 mA (1250 mA/g FeS). Only a very slight capacity decay is visible at these high rates. When returned to lower C/3-rates the original capacity was fully retained.

In the right graph in the middle of the figure, the different C-rates per cycle are shown.

In the bottom graph of the figure the charge/discharge cycles are depicted with the capacity on the x-axis and the voltage profile on the y-axis. The curves reaching unto 17 mAh/g correspond to the second 50 cycles (at 150 C-rate). The curves reaching unto 60 mAh/g correspond to the first 30 cycles (6C-rate) and the curves reaching most far correspond to the last cycle.

The resulting battery was able to allow a current density of around 130 mA/$cm^2$ and a power density of 1150 W/kg of FeS, which would result in 700 W/kg for the complete battery including nickel hydroxide, while maintaining 100% coulombic efficiency. Lead-acid batteries go up to 500 W/kg and would not be able to be fully discharged for multiple cycles. Because no depreciation of cycling behavior was seen, higher power densities are expected to be possible.

Subsequent to the 50 deep discharges at a C150-rate, the battery showed excellent behavior when cycled at C/4-rate again.

After these tests the same pill was successfully cycled for 150 cycles at a 6C-rate. This is visible in FIG. 2.

Figure 2:
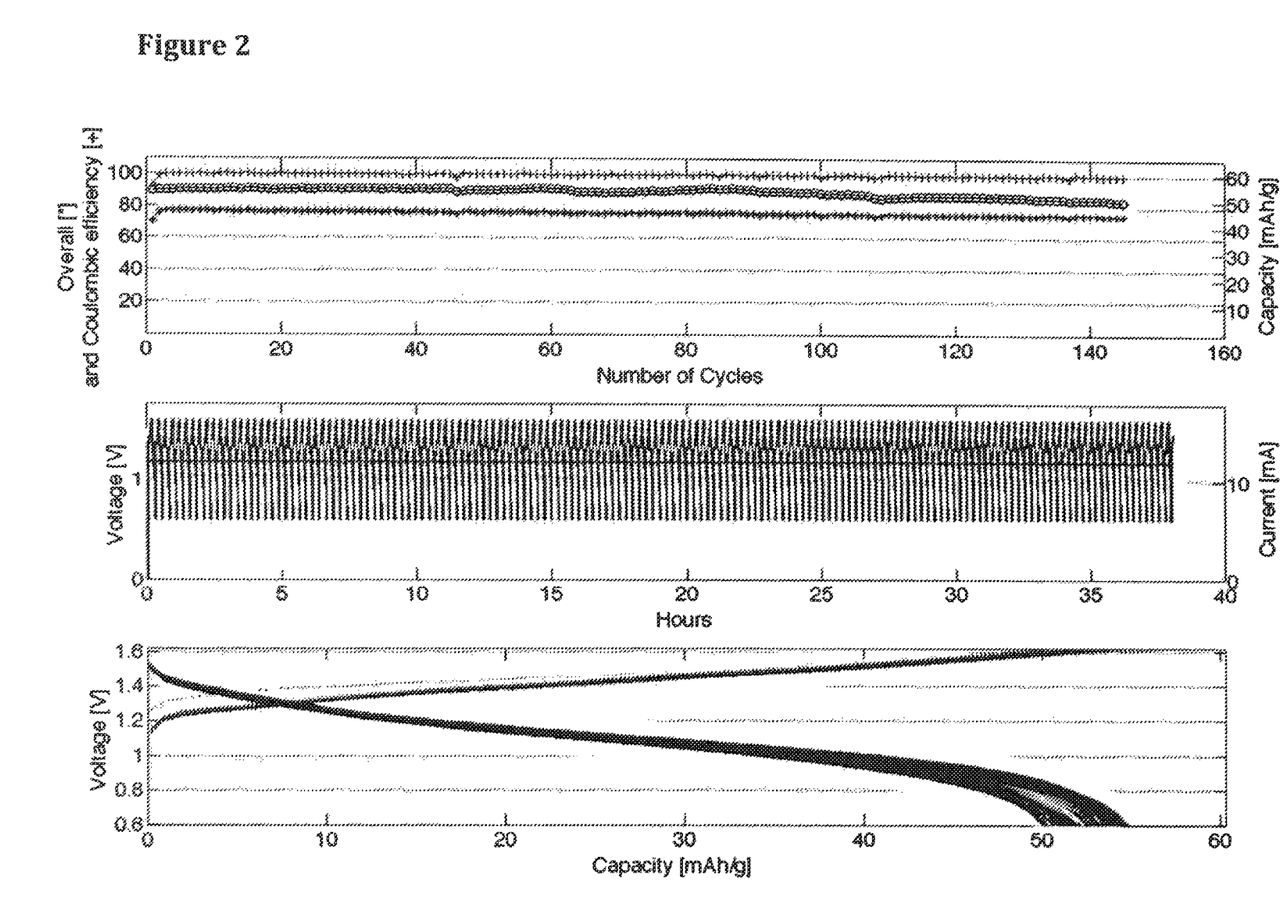
FIG. 2 shows the results of further cycle tests on a battery according to the invention.

In FIG. 2 the same type of graphs are shown as in FIG. 1. The cycles were run at an 8C-rate and showed a successful 140 cycles with only a very little capacity decay at the end of the 140 cycles. These graphs show that the battery is promising in terms of stability and cycle life, since no significant efficiency reduction or capacity decay occurs when cycled at high rates (8C). As an example, Lead-acid batteries would not have lasted 100 cycles at this high charges at large depth of discharge.

EXAMPLE 2

In this Example, the iron sulphide used in Example 1 was dry ground together with carbon black as a conductor, polytetrafluorethyleen (PTFE) as a binder, and iso-butylpropanol as a solvent, with the grinding taking place analogous to the procedure described in Example 1 above. Extra iso-butylpropanol can be added to distribute the PTFE better throughout the slurry. A substrate of iron or nickel mesh can be used. The electrode is tested in the same way. The electrode showed good robust behavior and a cycling efficiency of 84% when charged in 4 hours and discharged in 2 hours, to resemble a typical solar energy system charge and discharge profile. With this electrode 150 cycles have been run without capacity decay. The capacity was 150 mAh/g for the iron sulphide.

EXAMPLE 3

Example 2 was repeated, except that instead of PTFE as a binder and isobutylpropanol (or butanol) as solvent, polyvinylidene difluoride (PVDF) was used with acetone as solvent. The resulting battery was similar to that in example 2. The electrodes were formed by razor blading the wet-slurry to a 0.5 mm thick electrode coated on a substrate (e.g. nickel coins). It was more difficult to make thick electrodes with this process. Pressing the electrode material was therefore more favorable.

EXAMPLE 4

The iron sulphide was ground and then mixed with a 60 wt. % PTFE aqueous solution. The mixture was dried and iso-butylpropanol was added as a solvent for the PTFE. The resulting mixture was mixed, dried and pressed together. A mesh was used as required. The electrode consisted of varying amounts of PTFE, ranging from 0% to 40% PTFE. When more PTFE was used, cycling efficiency and energy capacity decayed. This is visible in FIG. 3, which shows the overall efficiency of the batteries against the number of cycles.

Figure 3:
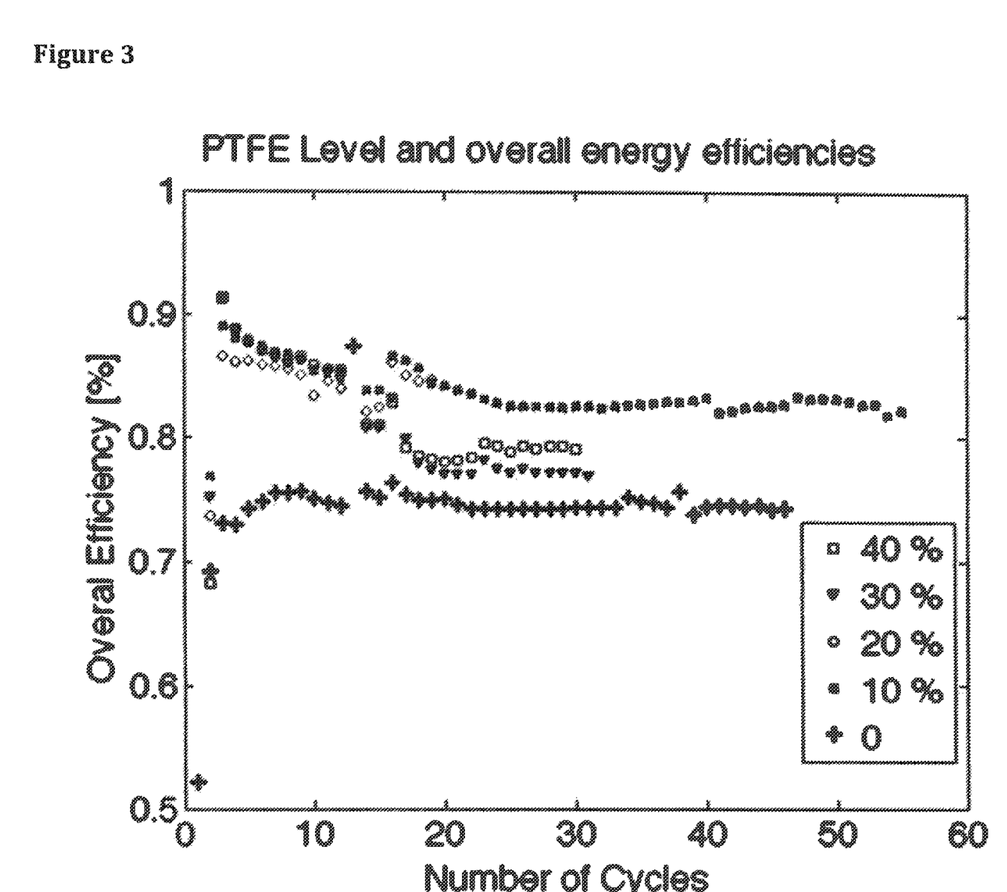
FIG. 3 shows the energy efficiency of batteries according to the invention at different PFTE levels.

FIG. 3 shows that when 10 or 20% PTFE was used the efficiency increases as compared to a system not containing PTFE. This is believed to be caused by improved rigidness of the electrode. When 30 of 40% of PTFE is used, the efficiency decreases. This is related to the conductivity of the electrode which will be reduced by too much the PTFE.

The reason that the efficiency of pure FeS is lower than in other experiments (e.g. compared to FIG. 2), is due to the fact that the FeS in this example was ground not as long as in example 1 and therefore comprised larger FeS particles.

EXAMPLE 5

To investigate the effect of lithium, an electrolyte containing 1 M LiOH and 5 M KOH was used. The results are presented in FIG. 4.

Figure 4:
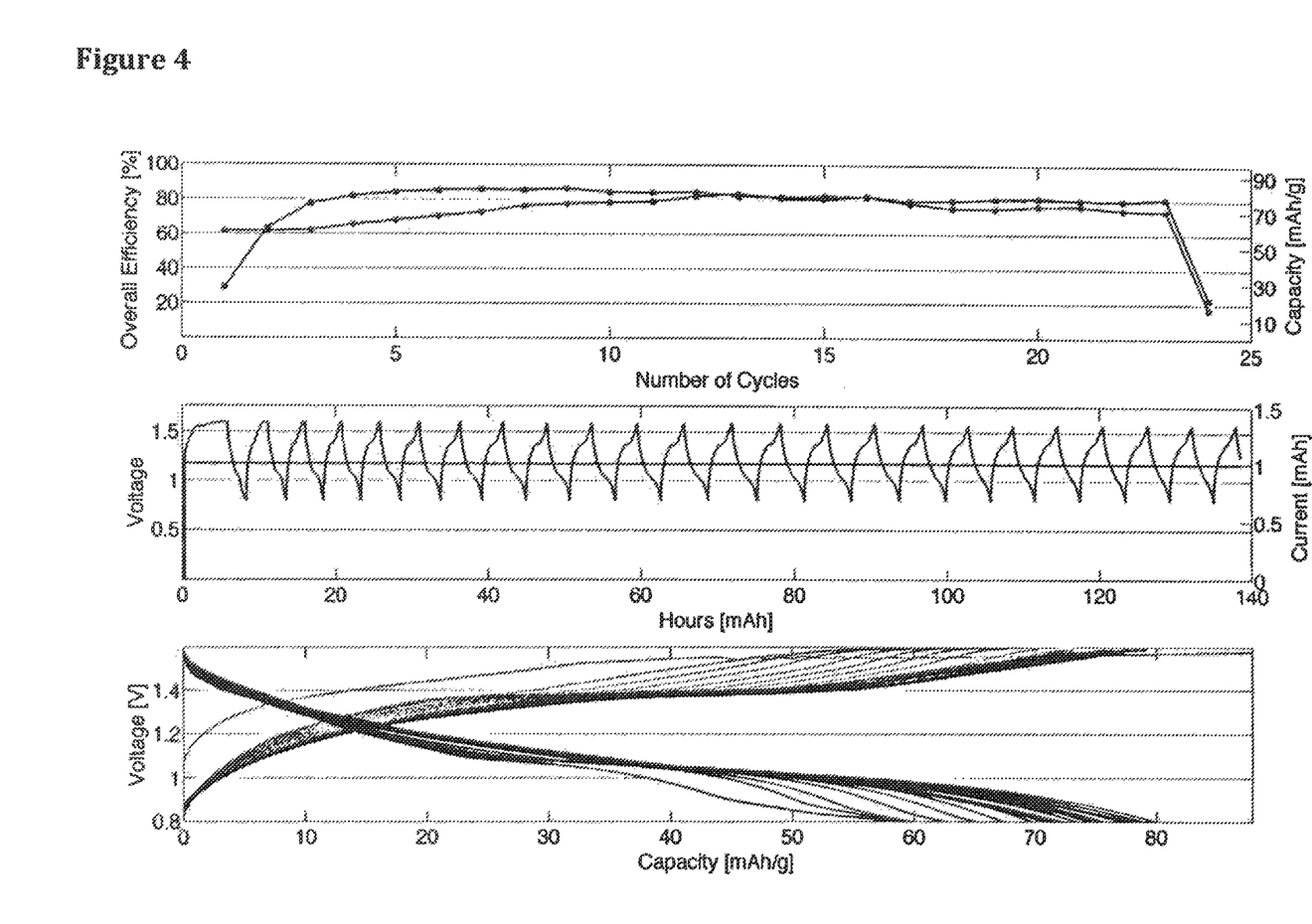
FIG. 4 shows the results of cycle tests of a battery using an Li-containing electrolyte.

FIG. 4 shows three graphs.

The top graph: the overall efficiency (the line with square points) is denoted on the left y-axis, and the capacity (the line with round point) is indicated on the right y-axis. Every data point corresponds to 1 charge and 1 subsequent discharge, called one cycle. The efficiency and capacity increased upon initial cycles and stays stable for the first 20 cycles. The efficiency of 78-82% is acceptable and the capacity is smaller than when no LiOH is used, but still reasonably about 80 mAh/g of FeS. The middle graph: the voltage profile on the left and the current on the right y-axis, against the time on the x-axis. The curves look more wobbly when compared with the charge/discharge curves without LiOH in the electrolyte. As is visible, the charge and discharge plateaus have the tendency to disappear and flatten out, i.e. the charge and discharge curve become more a line with a positive and negative slope on charge and discharge, respectively. As compared to a system not containing LiOH, we found that the activation happens faster when LiOH is used, but the energy density and energy efficiency is slightly lower than when no LiOH is used. It appeared that the presence of lithium has a small stabilizing effect on the initial charge and discharge curves. The subsequent curves however show capacity decay, something which is not observed when LiOH is not used.

EXAMPLE 6

Similar to example 1, a pure iron-sulphide pill was tested at different C-rates. It was found that different C-rates show comparable good cycling behavior. The same procedure as in example 1 has been used, only this time the battery was subjected to different C-rates to measure the associated capacity.

Figure 5:
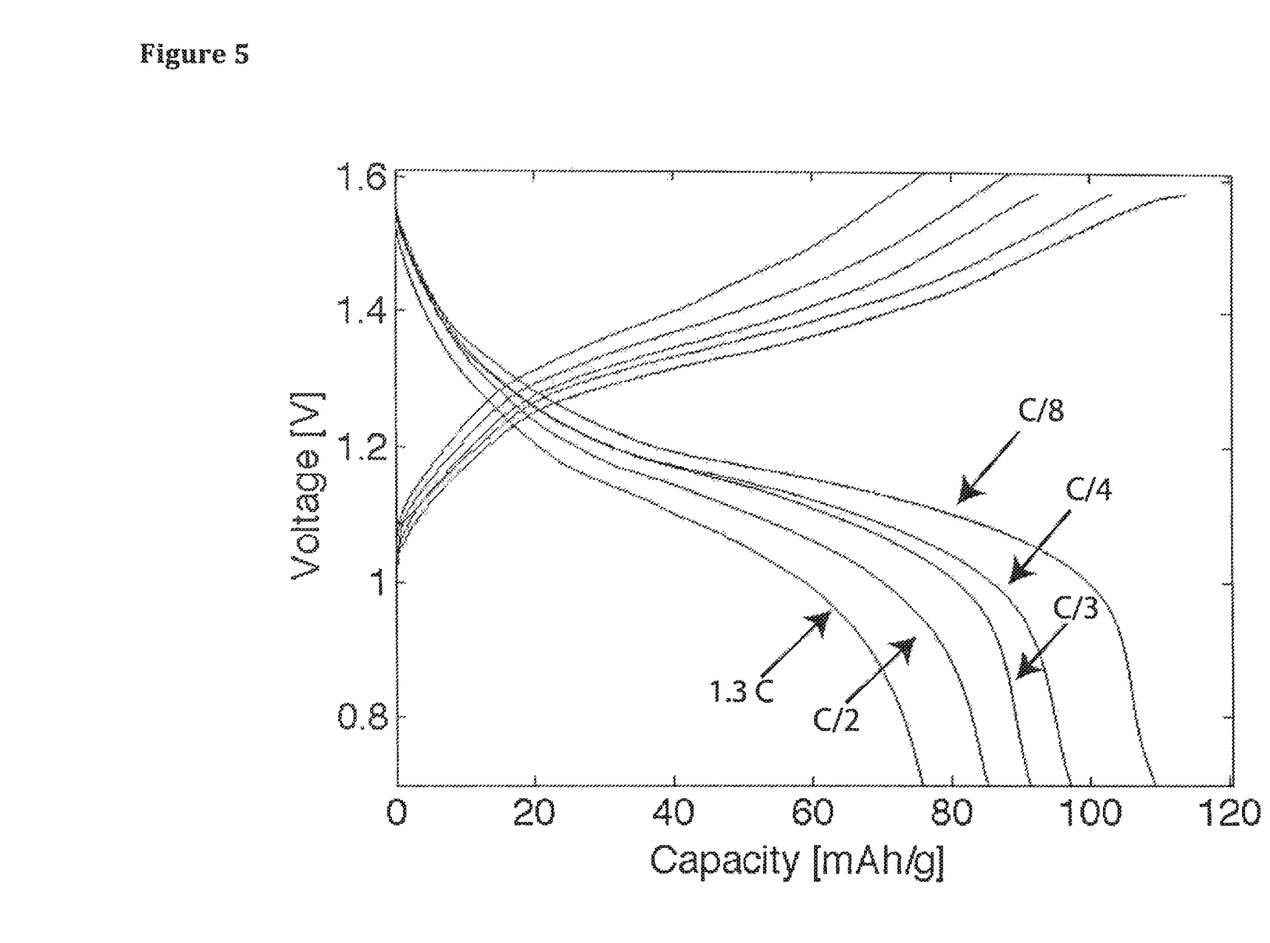
FIG. 5 shows the voltage/capacity plot of a battery according to the invention at different currents.

The results are presented in FIG. 5. This figure shows the capacity on the x-axis and the voltage of the charge and discharge curves on the left-hand y-axis for different currents (C-rates). The same current was used for charge and discharge. The graphs show the result of these different C-rates. The tendency of a decreased capacity at higher C-rates occurs in a normal fashion, i.e. the capacity doesn't decrease unfavorably fast at high charge/discharge rates. The voltage profile curve remains the same and therefore suggests that the battery works well at different charge rates.

It can be seen that that the capacity decays once a higher C-rate is applied. This is a very common effect known as the Peukert effect.

EXAMPLE 7

Figure 6:
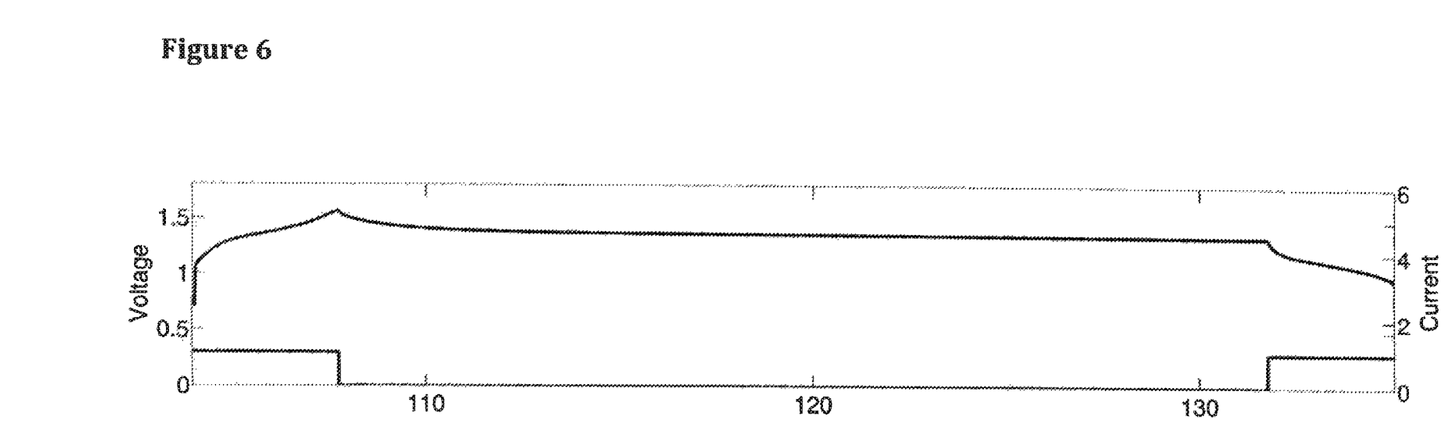
FIG. 6 shows the results of a self-discharge test of a battery according to the invention.

The self-discharge was measured by charging a battery based on a pure FeS pill as electrode. After charge, the battery was set to open circuit (i.e. no connections) at zero current for 24 hours while measuring the voltage. After 24 hours the battery was discharged and it was found that no current had been lost. In 24 hours no self-discharge occurred, with respect to 5% self-discharge per day with Nickel-Iron batteries. The results are depicted in FIG. 6.

The invention claimed is:

1. A battery comprising an anode comprising iron sulphide as active material, with the sulphur content being at least 10 wt. % up to 70 wt. % or less of the total of iron and sulphur, a cathode, and an alkaline electrolyte comprising an alkaline component dissolved in water, with the anode comprising less than 50 wt. % of active materials other than iron sulphide.

2. The battery according to claim 1, wherein the sulphur content of the anode is in a range of 20-40 wt. %.

3. The battery according to claim 1, wherein the iron sulphide is derived from a natural iron sulphide mineral.

4. The battery according to claim 1, wherein the anode contains less than 20 wt. % of active materials other than iron sulphide.

5. The battery according to claim 1, wherein the anode comprises a binder.

6. The battery according to claim 1, wherein the anode comprises conductive particles.

7. The battery according to claim 1, wherein the anode is porous.

8. The battery according to claim 1, wherein the cathode comprises nickel hydroxide, air-cathodes, manganese dioxide, or cadmium as active material.

9. The battery according to claim 1, wherein the electrolyte is an aqueous solution comprising a hydroxide of an alkali metal.

10. An anode suitable for use in the battery according to claim 1, which comprises iron sulphide as active material, having a sulphur content of at least 10 wt. % up to 70 wt. % or less of the total of iron and sulphur, and comprising less than 50 wt. % of active materials other than iron sulphide.

11. The battery according to claim 1, wherein the anode contains less than 10 wt. % of active materials other than iron sulphide.

12. The battery according to claim 1, wherein the cathode comprises nickel hydroxide.

13. The battery according to claim 1, wherein the electrolyte is an aqueous solution comprising lithium, potassium, sodium or cesium hydroxide or any combination thereof.

14. The battery according to claim 1, wherein the electrolyte is an aqueous solution comprising potassium hydroxide and/or sodium hydroxide.

15. A method for manufacturing the anode as claimed in claim 1, which comprises the steps of providing particulate iron sulphide, and shaping the particulate iron sulphide to form a shaped object.

16. The method according to claim 15, wherein the particulate iron sulphide has a mean particle diameter in a range 1-1000 nm.

17. The method according to claim 15, wherein further components are added to the iron sulphide before shaping.

18. The method according to claim 15 wherein the particulate iron sulphide has a mean particle diameter in a range of 50-600 nm.

19. A device selected from a stationary energy storage device, a peak shaving grid connected device, an automotive battery, a forklift truck, a penlite, a stand-alone energy system, and an electric vehicle comprising the battery of claim 1.

* * * * *